United States Patent
Itabashi

(10) Patent No.: US 7,634,804 B2
(45) Date of Patent: Dec. 15, 2009

(54) INFORMATION PROVIDING SYSTEM AND METHOD THEREOF

(75) Inventor: Tatsuo Itabashi, Tokyo (JP)

(73) Assignee: Sony Corporation, Tokyo (JP)

(*) Notice: Subject to any disclaimer, the term of this patent is extended or adjusted under 35 U.S.C. 154(b) by 338 days.

(21) Appl. No.: 11/280,082

(22) Filed: Nov. 16, 2005

(65) Prior Publication Data

US 2006/0070121 A1    Mar. 30, 2006

Related U.S. Application Data

(63) Continuation of application No. 09/845,948, filed on Apr. 30, 2001, now Pat. No. 6,990,683.

(30) Foreign Application Priority Data

Apr. 28, 2000   (JP)   ............................. P2000-134317

(51) Int. Cl.
*H04L 9/32*   (2006.01)
(52) U.S. Cl. .................... 726/9; 726/4; 726/6; 705/16; 705/17; 705/65
(58) Field of Classification Search .................. None
See application file for complete search history.

(56) References Cited

U.S. PATENT DOCUMENTS

| | | | | |
|---|---|---|---|---|
| 5,796,832 | A * | 8/1998 | Kawan | 705/65 |
| 6,282,522 | B1 * | 8/2001 | Davis et al. | 705/41 |
| 6,442,532 | B1 * | 8/2002 | Kawan | 705/36 R |

FOREIGN PATENT DOCUMENTS

| | | |
|---|---|---|
| JP | 06121075 | 4/1994 |
| JP | 09116960 | 5/1997 |
| JP | 09312708 | 12/1997 |
| JP | 11345268 | 12/1999 |
| JP | 2000011069 | 1/2000 |

OTHER PUBLICATIONS

Denning et al.; "Location-Based Authentication Grounding Cyberspace for Better Security"; Feb. 1996; Computer Fraud & Security; Elsevier Science Ltd; pp. 12-16.*

* cited by examiner

*Primary Examiner*—Jung Kim
(74) *Attorney, Agent, or Firm*—K&L Gates LLP

(57) ABSTRACT

An information providing system which includes: an IC card; a settlement center which monitors and holds contents information of the IC card, and upon receiving the contents information readout request, provides the information held therein to the requesting party; communication networks; an information center which, upon receiving a contents information request, outputs a contents information readout request to the settlement center and requests contents information of the IC card, and upon receiving the contents information, transmits this to the communication networks; and a communication terminal which transmits a contents information request to an information center, and upon receiving the contents information of the IC card transmitted from the information center, displays the contents information on a display unit. Thus, a user can readily confirm the contents of the data in a data holding member such as an IC card without necessitating installment of a special viewer and without necessitating the user to carry a device which is only occasionally used.

32 Claims, 15 Drawing Sheets

FIG. 6

| TERMINAL ID | CARD ID |
|---|---|
| △ △ △ △ | × × × × |
| ☐ ☐ ☐ ☐ | ○ ○ ○ ○ |
| ⋮ | ⋮ |

INFORMATION PROVIDING SYSTEM AND METHOD THEREOF

CROSS REFERENCE TO RELATED APPLICATION

This patent application is a continuation of U.S. application Ser. No. 09/845,948, filed on Apr. 30, 2001 now U.S. Pat. No. 6,990,683, the disclosure of which is herein incorporated by reference.

BACKGROUND

The present invention relates to an information providing system for performing settlement, updating of information, etc., by communicating data containing personal information and the like identifying the user of an identification card, such as an IC card, used for commercial transactions for example, and a method for the system.

In recent years, there has been an increase in devices which perform exchange of services or goods for payment of money, i.e., commercial transactions, such as POS (point-of-sales) terminals, automatic vending machines, and so forth.

However, such devices are configured based on the presumption that cash is to be used for payment, so the business operating the device must always keep the device stocked with change money, count and match the cash, take measures to prevent crime, and other such daily tasks, which are troublesome.

Accordingly, IC cards are beginning to be widely used for such commercial transactions, the IC cards being arranged with an IC module which stores or subjects to predetermined processing personal information identifying the user or data for the transaction, thereby providing the IC cards with settlement functions, and functions for points or electronic money.

Such commercial transactions using the IC cards are advantageous in that settlement can be performed simply by exchanging electronic data and, further, that the troublesome handling of cash described above can be done away with.

With IC cards or the like, data is written, deleted, updated, etc., using a dedicated reader/writer having transmitting/receiving functions, for example.

However, the user of such an IC card must use a special viewer (including POS terminals or the like) to confirm the data contents of the IC card. In the event that the user does not have access to such a viewer, the user has no way to know, make reference to, or confirm the contents of the data in the IC card.

There are dedicated viewers for electronic money, but either business or user must bear the cost of the terminal. Further, such an arrangement necessitates the user to carry a device which is not used for anything but occasional conforming of the contents of the IC card by the user.

Also, in the event that settlement is performed at a shop using the IC card, there are cases necessitating a numeric keypad for the user to input a PIN (Personal Identification Number) to the POS terminal or the like. However, there is always the possibility that another individual might observe the user inputting the PIN with a numeric keypad on the counter of a shop.

In the same way, there is the possibility that some sort of device might be attached between the numeric keypad and the cash register or personal computer or the like performing the transaction, to steal the numeric information which the user has input.

SUMMARY

The present invention has been made in light of the above, and accordingly, it is a first object of the present invention to provide an information providing system which allows a user to readily confirm the contents of the data in a data holding member such as an IC card without necessitating installment of a special viewer and without necessitating the user to carry a device which is only occasionally used, and a method for the system.

It is a second object of the present invention to provide an information providing system which can prevent verification information or the like being observed or stolen at predetermined settlement locations, prevent unauthorized use, and allow settlement to be performed with a high degree of safety, and a method for the system.

To this end, according to a first embodiment of the present invention, an information providing system is provided which enables viewing of the contents of a data holding device capable of holding data including personal information for recognizing at least users, using a communication terminal device, wherein the system includes: a first information processing unit for monitoring and holding contents information of the data in the data holding device, and providing the contents information held therein upon receiving a contents information readout request; and a second information processing unit for receiving contents information access requests sent from the communication terminal device via a communication network and outputting the contents information readout request to the first information processing unit so as to request supply of contents information of the data holding device, and transmitting the supplied contents information to the communication terminal device; the communication terminal device including a display unit, a communication unit, and a transmitter for transmitting the contents information access requests from the communication unit to the second information processing unit, and receiving the contents information of the data holding device transmitted from the second information processing unit; such that received contents information is displayed on the display unit. Here, the first information processing unit corresponds to a "settlement center" described in more detail in the preferred embodiments, and the second information processing unit likewise corresponds to an "information providing center" described in more detail in the preferred embodiments.

The communication terminal device may transmit terminal identification information in addition to the contents information access requests, and the second information processing unit may collate received terminal identification information and pre-registered terminal identification information and output the contents information readout request to the first information processing unit in the event that the two match.

The information providing system may further include a dedicated terminal device for performing exchange of data between the first information processing unit and the data holding device, wherein the first information processing unit performs predetermined processing based on the data holding device data, and updates the data held therein.

The data holding device may be an IC card, the communication terminal device may be configured of a cellular telephone, and the cellular telephone and the second information processing unit may be connected via a cellular telephone communication network. The communication terminal device may be configured of a personal computer communication terminal device, and the personal computer communication terminal device and the second information processing unit may be connected via the Internet.

According to a second embodiment of the present invention, an information providing method is provided wherein a first center (the settlement center) provides information, the method including the steps of: monitoring and holding of contents information of data of multiple data holding devices capable of holding data including personal information for recognizing at least users; and, upon receiving a contents information access request, obtaining the contents information held in corresponding data holding devices from the multiple data holding devices, and supplying the obtained contents information to the requesting party.

The contents information access request may be transmitted by a request signal being received by an information access request processing unit from the communication terminal device via the communication network thereof, and then subjected to predetermined processing.

Also, identification information of the communication terminal device may be transmitted to the access processing unit along with the contents information access request, where collation is performed, and in the event that positive results are obtained from the collation, the contents information access request may be transmitted.

The supplied contents information may be displayed on a predetermined terminal device.

The information providing method may further include the steps of: performing settlement processing regarding settlement performed by the data holding device; and updating the contents information of data of the data holding device generated by the settlement processing, and transmitting to the data holding device.

Also, the updated information may be displayed on the communication terminal device.

According to a third embodiment of the present invention, an information providing method, is provided wherein a second center (the information providing center) provides information, the method including the steps of: receiving from a communication terminal device contents information access requests for data of a data holding device holding data including personal information for recognizing at least users; performing verification of the communication terminal device, and upon receiving positive results, transmitting a contents information readout request for obtaining contents information of a corresponding data holding device to an information processing unit monitoring and holding contents information of the data of the data holding device; obtaining necessary contents information by the contents readout request; and transmitting obtained contents information of the data holding device to the communication terminal device.

According to a fourth embodiment of the present invention, an information providing system is provided for performing predetermined processing using a data holding device capable of holding data including personal information for recognizing at least users, and a communication terminal device, wherein the system includes: a first information processing unit which, upon receiving transaction start information via a communication network, outputs a verification response confirmation request, performs predetermined processing based on the data of the data holding device upon receiving a response signal sent from the communication terminal device, and holds at least processing data; and a second information processing unit which, upon receiving the verification response request, confirms the communication terminal device corresponding to the identification information of the data holding device registered beforehand, calls up the communication terminal device via the communication network, and upon receiving a response signal from the communication terminal device supplies the response signal to the first information processing unit.

The first information processing unit may receive identification information of the data holding device in addition to transaction start information, perform collation of the identification information, and in the event that positive results are obtained from the collation, output a certification response confirmation request to the second information processing unit.

The communication terminal device may transmit terminal identification information in addition to the response signal, and the second information processing unit may perform collation between the received terminal identification information and pre-registered terminal identification information, and output the received response signal to the first information processing unit in the event that these two match.

The second information processing unit may control output of response signals to the first information processing unit based on position information of the communication terminal device.

The first information processing unit may monitor and hold contents information of data of the data holding device, and upon receiving a contents information readout request, may provide the contents information held in the corresponding data holding device to the requesting party. Also, upon receiving a contents information access request, the second information processing unit may output a contents information readout request to the first information processing unit and request the contents information of the data holding device, and transmit supplied contents information to the communication network. Here, the communication terminal device may further include at least a display unit, with the contents information access request being transmitted by the communication unit thereof to the second information processing unit via the communication network, the contents information being displayed on the display unit upon the contents information of the data holding device transmitted from the first information processing unit having been received via the communication network.

According to a fifth embodiment of the present invention, an information providing system is carried out using a first data holding device capable of holding data containing personal information identifying at least users, a second data holding device capable of holding data containing information identifying providers which provide at least products or services, and a communication terminal device capable of performing data exchange between the first and second data holding devices and capable of communicating via a communication network; wherein the system includes an information processing unit which performs predetermined collation upon reception of data of the second data holding device transmitted from the communication terminal device, and upon obtaining positive collation results transmits a transaction processing continuation signal to the communication terminal device via the communication network, and then upon receiving the data of the first data holding device performs predetermined processing based on the received data, and holds at least processing data.

According to a sixth embodiment of the present invention, an information providing method is provided which uses a first data holding device capable of holding data containing personal information identifying at least users and a second data holding device capable of holding data containing information identifying providers which provide at least products or services, wherein the method includes the steps of: transmitting data of the second data holding device from the communication terminal device; receiving data of the second data holding device and performing predetermined collation thereof, and upon obtaining positive collation results transmitting a transaction processing continuation signal to the communication terminal device; transmitting data of the first data holding device; and upon receiving the transmitted data of the first data holding device performing predetermined processing based on the data, and holding at least processing data.

In the data transmitting step of the first data holding device, identification information of the first data holding device may be transmitted in addition to the data, and in the processing data holding step, collation of the identification information may be performed, and in the event that positive collation results are obtained, predetermined processing may be performed based on the data of the first data holding device. Also, in the transmitting step for the transaction processing continuing signal, location information of the communication terminal device may be confirmed, and in the event that judgment is made that the communication terminal device is at a location matching pre-registered position information, a transaction processing continuing signal may be transmitted. Also, in the transmitting step for the transaction processing continuing signal, location information of the communication terminal device may be confirmed, and in the event that judgment is made that the communication terminal device is at a location matching pre-registered position information, a transaction processing continuing signal may be transmitted.

Also, the first and second data holding devices may each be IC cards.

According to a seventh embodiment of the present invention, a program causes a computer to execute the steps of: receiving data of a shop data holding device capable of holding data containing information identifying at least providers which provide products or services, transmitted from a communication terminal device; receiving data of the shop data holding device and performing predetermined collation thereof, and upon obtaining positive collation results transmitting a transaction processing continuation signal to the communication terminal device; receiving data of a user data holding device capable of holding data containing personal information identifying at least users, transmitted from the communication terminal device; and, upon receiving the data of the user data holding device, performing predetermined processing based on the data, and holding at least processing data.

In the data reception, identification information of the user data holding device may be received in addition to the data of the user data holding device and, in the processing data holding, upon performing collation of the identification information and obtaining positive collation results, predetermined processing may be performed based on the data of the user data holding device. Also, in the transaction processing continuing signal transmission, position information of the communication terminal device may be confirmed, and in the event that judgment is made that the communication terminal device is at a pre-registered position, the transaction processing continuing signal may be transmitted.

Also, the communication terminal device may be a cellular phone.

Additional features and advantages of the present invention are described in, and will be apparent from, the following Detailed Description of the Preferred Embodiments and the Drawings.

Additional features and advantages are described herein, and will be apparent from, the following Detailed Description and the figures.

BRIEF DESCRIPTION OF THE FIGURES

FIG. 6 is a diagram illustrating a registration data example of a card database.

DETAILED DESCRIPTION

First Embodiment

Figure 1:
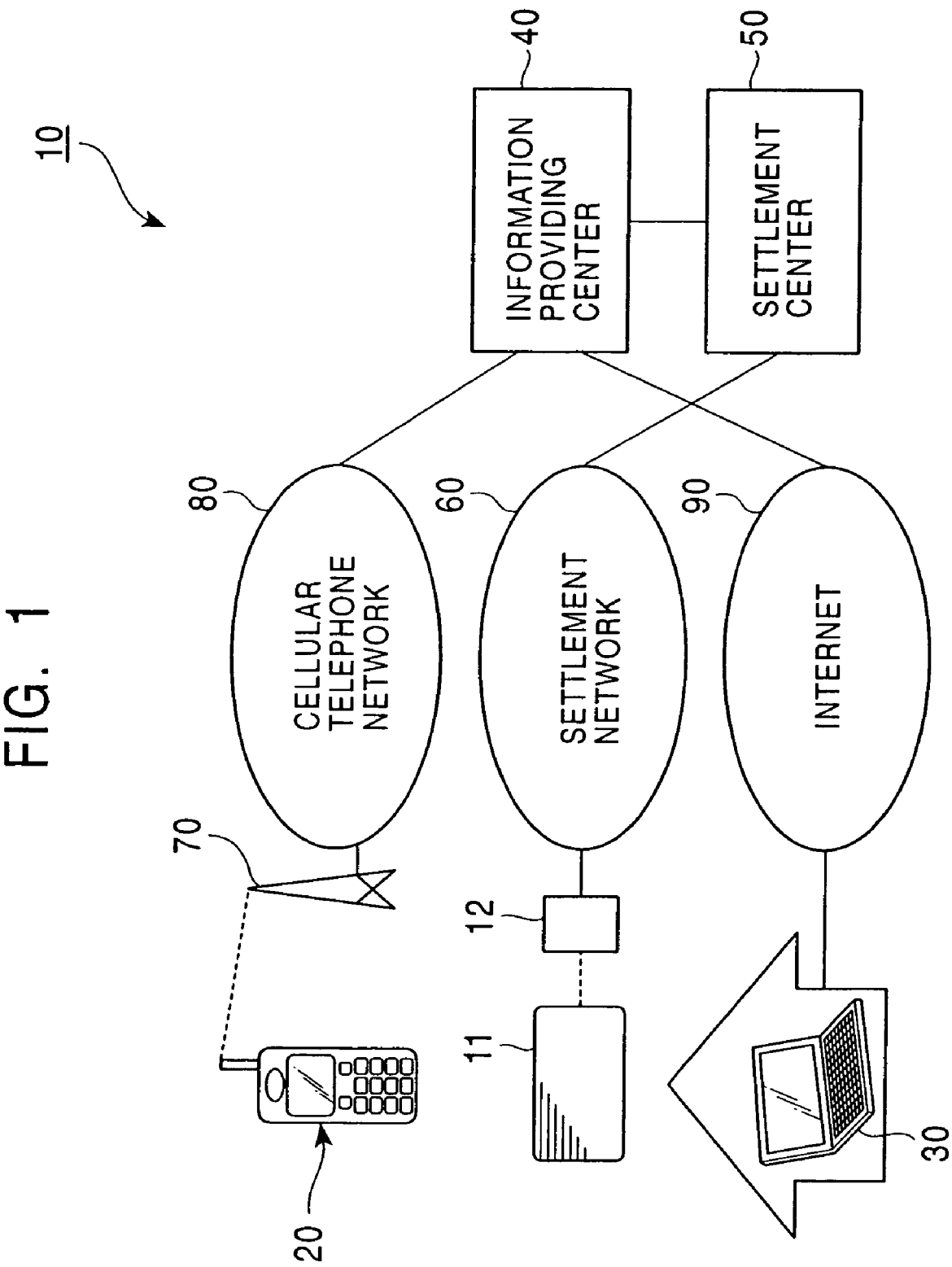
FIG. 1 is a configuration diagram illustrating a first embodiment of the information providing system according to the present invention.

FIG. 1 is a configuration diagram illustrating a first embodiment of the information providing system according to the present invention.

The present information providing system 10 is made up of an IC card 11, a dedicated terminal 12 such as a POS terminal or reader/writer, or vending machine or the like, portable communication terminal 20, personal computer communication terminal 30, information providing center 40 serving as a second center, a settlement center 50 serving as a first center, a settlement network 60, a base station 70, a cellular telephone network 80, and the Internet 90.

Figure 2:
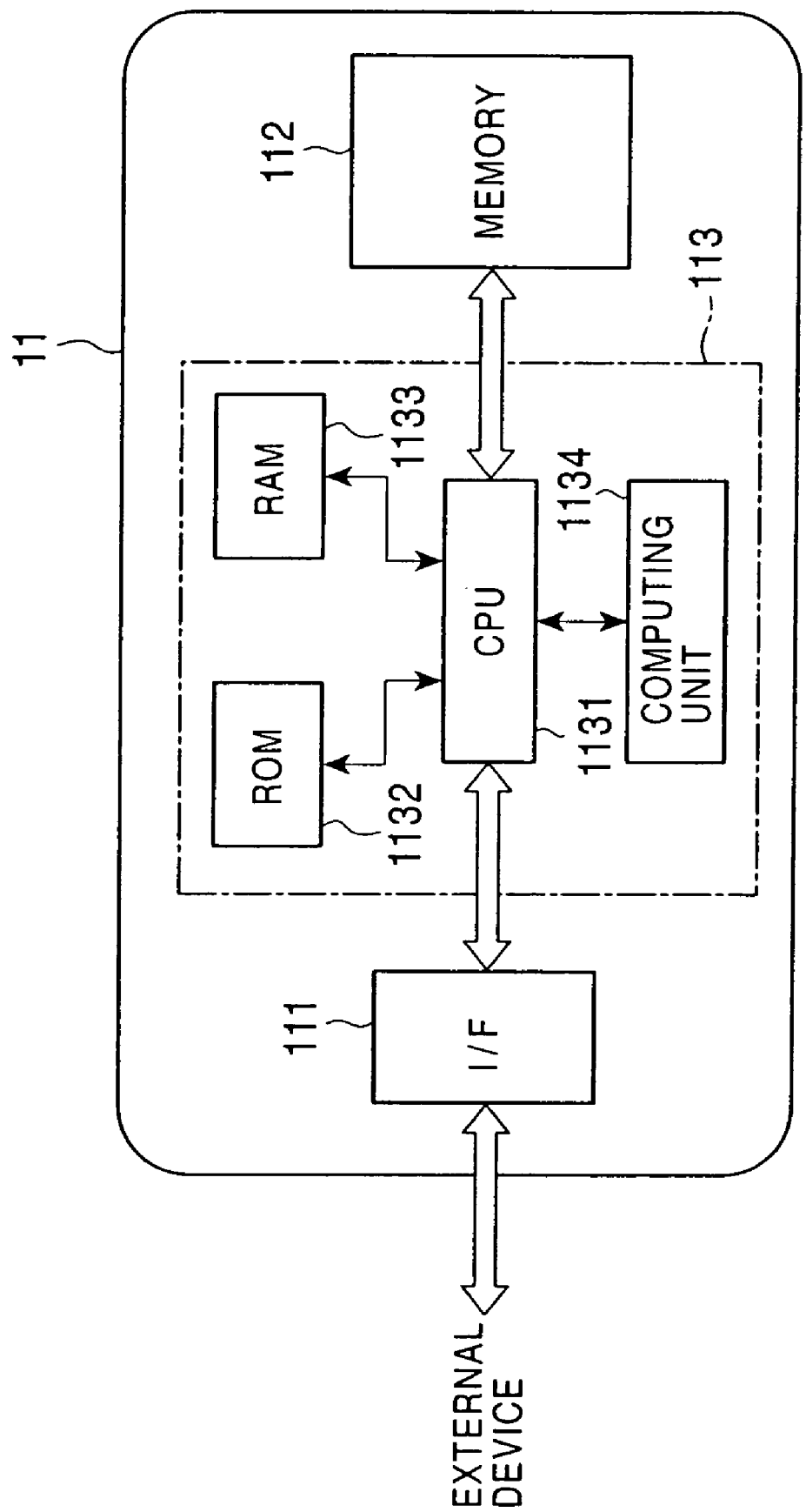
FIG. 2 is a diagram illustrating function blocks of an IC card.

As shown in FIG. 2 for example, the IC card is primarily made up of an interface unit 111, a memory unit 112, and a control unit 113.

The interface unit 111 is for exchanging data between the control unit 113 and a dedicated terminal 12 which is an external device, i.e., for performing communication processing, either through contact or without contact.

The memory unit 112 is made up of non-volatile memory for example, and stores, under control of the control unit 113, the verification number of the cardholder of the IC card 11, information relating to the account of the user and relating to the bank where the account is situated, and further unsettled information and transaction completion information containing information relating to the bank account number of the vendor of the like of goods or services, items purchased, the price of the items purchased, date and time of purchase, etc., each time goods or services are purchased using a dedicated terminal 12 such as a POS terminal, reader/writer, vending machine, etc.

The control unit 113 contains, for example, a CPU 1131, ROM 1132, RAM 1133, and a computing unit 1134, so as to read out application programs stored in the ROM 1132 or data stored in the memory unit 112 and RAM 1133, thereby performing verification processing, settlement processing, or enciphering/deciphering processing.

The dedicated terminal 12 is, as described above, made up of a POS terminal, reader/writer, vending machine, or the like, and performs data communication processing of enciphered data, for example, with the IC card 11, either through contact or without contact, and also exchanges settlement data and the like with the settlement center 50 by a reception/transmission circuit not shown in the drawings, via the settlement network 60, by wireless methods, for example.

Figure 3:
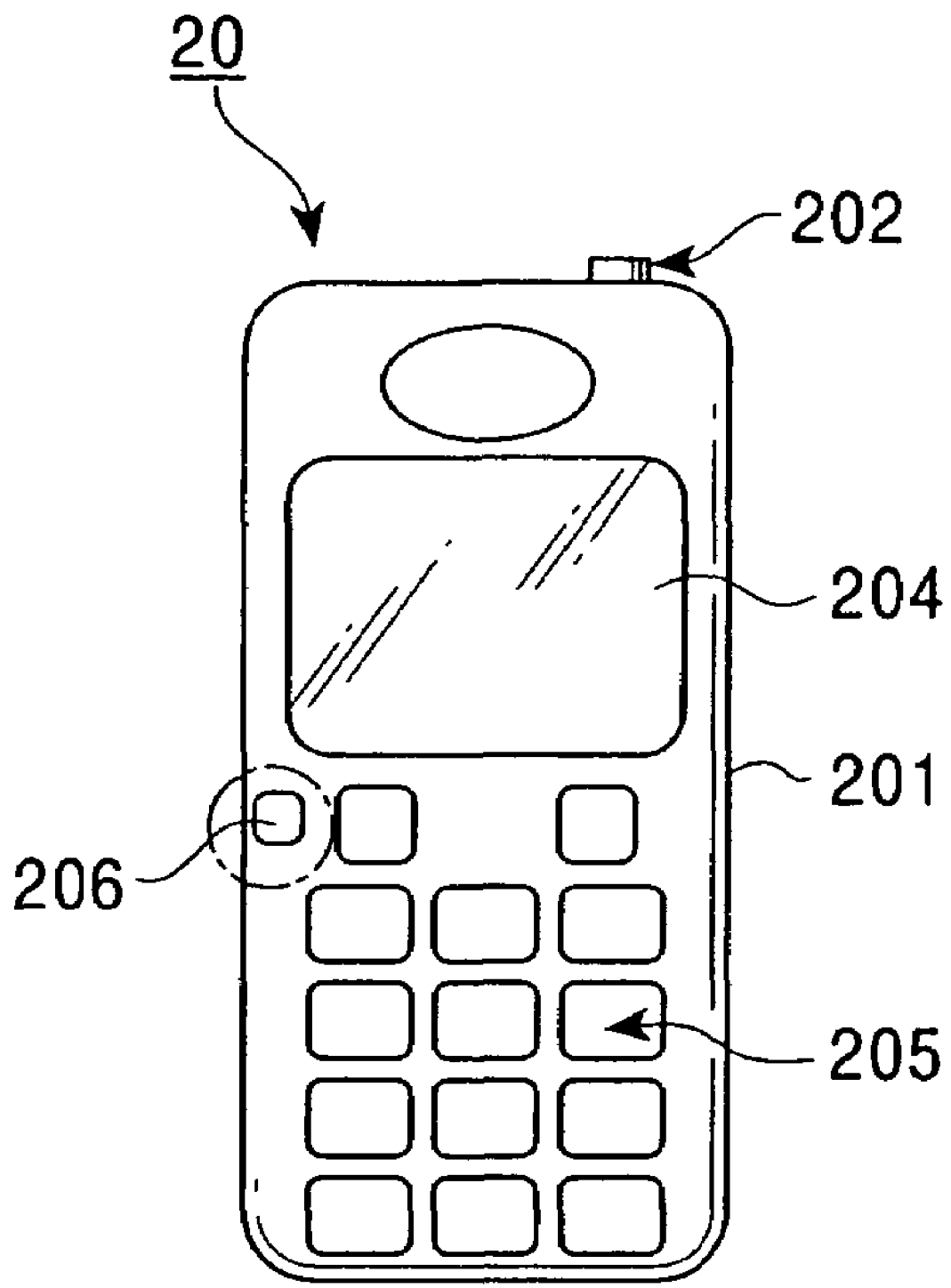
FIG. 3 is an external view of a portable communication terminal (cellular telephone) relating to the first embodiment.
Figure 4:
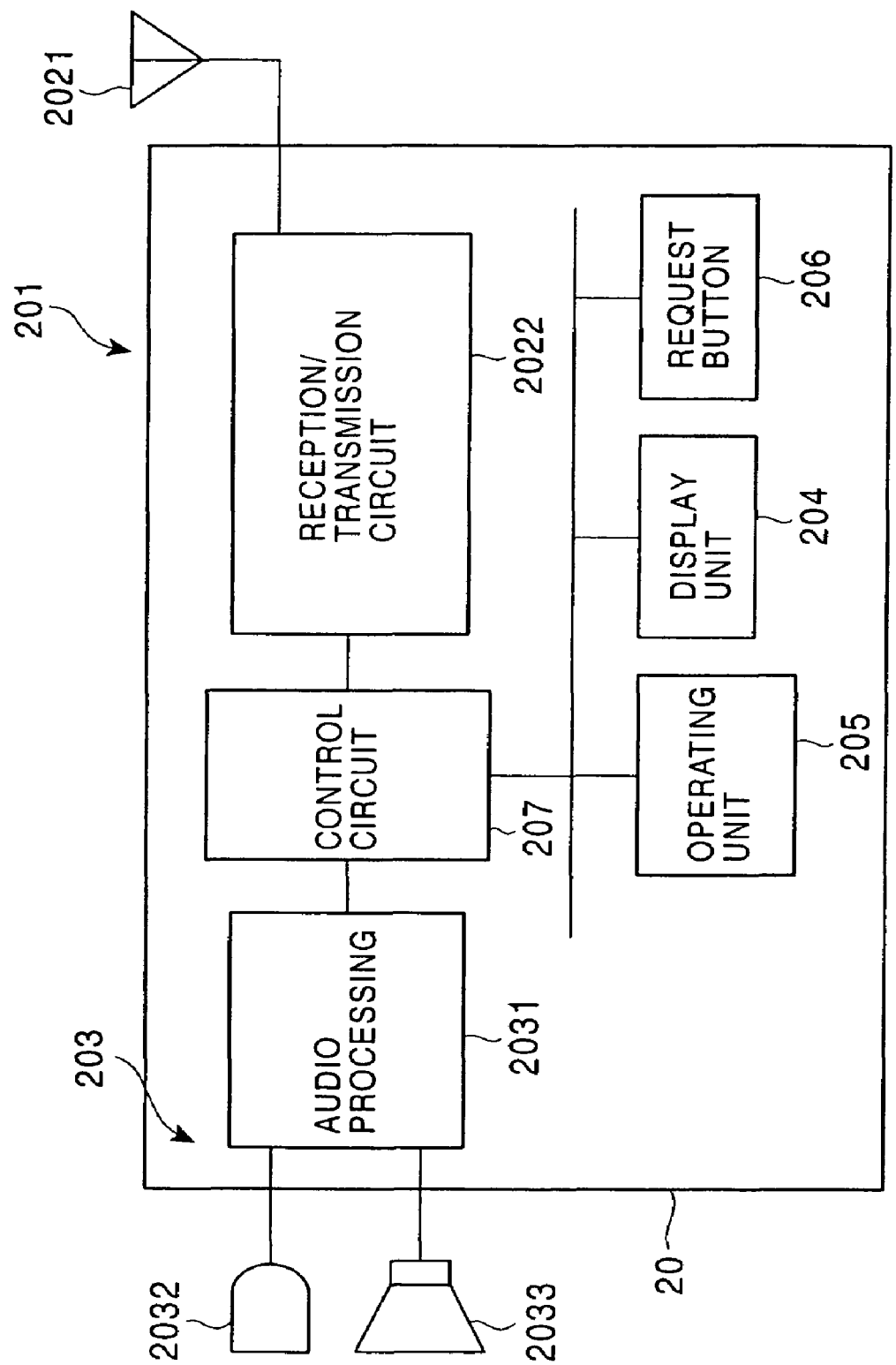
FIG. 4 is a diagram illustrating function blocks of the portable communication terminal (cellular telephone) relating to the first embodiment.

The portable communication terminal 20 is made up of a cellular telephone, for example, and as shown in FIGS. 3 and 4, includes a main unit case 201, a communication unit 202, an audio unit 203, a display unit 204, an operating unit 205, a request button 206, and a control circuit 207.

The communication unit 202 includes an antenna 2021 and a reception/transmission circuit 2022.

The reception/transmission circuit 2022 performs modulation of various types of information such as audio information or terminal ID or the like enciphered at the control circuit 207 and transmits this to the base station 70, and demodulates the various types of information such as information of the contents of the IC card 11, audio information, etc., received via the antenna 2021 and outputs this to the control circuit 207, thereby performing wireless communication using radio waves.

The audio unit 203 includes an audio processing circuit 2031, a microphone 2032, and a speaker 2033.

The audio processing circuit 2031 is connected to the microphone 2032 for performing audio input for communication functions, and the speaker 2033 for performing audio output, wherein voice and like audio input from the microphone 2032 is subjected to predetermined processing and is supplied to the control circuit 207, and audio information supplied from the control circuit 207 is subjected to predetermined processing and is output from the speaker 2033.

The display unit 204 is made up of a liquid crystal device or the like, and displays information of the contents of the IC card 11 transmitted from the information center 40, telephone numbers input for communication functions, etc.

The operating unit 205 is configured of a keyboard for inputting telephone numbers for communication functions, and inputting predetermined operation instructions.

The request button 206 is used in the case of using the portable communication terminal (cellular telephone) 20 as a so-called viewer, wherein the cardholder of the IC card 11 registered with the settlement center 50 displays the hysteresis information, remaining funds information, etc., stored in the IC card 11, on the display unit 204.

The control circuit 207 performs overall control of the communication terminal 20, so as to, for example, perform deciphering processing of the various types of information demodulated by the reception/transmission circuit 2022, performs enciphering processing for the various types of information transmitted to the information center via the base station 70 and network 80, perform audio processing, display processing, and so forth.

Also, in the event that the request button 206 is operated, the control circuit enciphers the identification information of the cellular telephone (terminal ID) as transmission information along with a contents information request signal, and supplies this to the reception/transmission circuit 2022.

The personal computer communication terminal 30 is made up of a home or office personal computer having communication functions, and is connected to the information center 40 via the Internet.

The personal computer communication terminal 30 not only includes a display unit (such as a liquid crystal device, for example) and an operating unit (keyboard) and the like, as known personal computers do, but also has a request button or equivalent functions used in the case of using the personal computer communication terminal 30 as a so-called viewer, wherein the cardholder of the IC card 11 registered with the settlement center 50 displays the hysteresis information, remaining funds information, etc., stored in the IC card 11, on the display unit thereof.

The personal computer communication terminal 30 is the same as other known personal computers except for this request function and, accordingly, description of detailed configurations and functions thereof will be omitted.

The information center 40 is connected to the cellular telephone network 80, Internet 90, and settlement center 50, and in the event of receiving an IC card contents information request signal and terminal ID from the portable communication terminal 20, or receiving an IC card contents information request signal and terminal ID from the personal computer communication terminal 30, the information center 40 performs collation of the terminal ID, and in the event that positive results are obtained for the collation, obtains the ID of the IC card registered beforehand corresponding to the terminal ID, requests contents information of the IC card corresponding to this ID from the settlement center 50, enciphers contents information obtained from the settlement center 50 as display information, and transmits the information to the portable communication terminal 20 or personal computer communication terminal 30 via the cellular telephone network 80 or the Internet 90.

Figure 5:
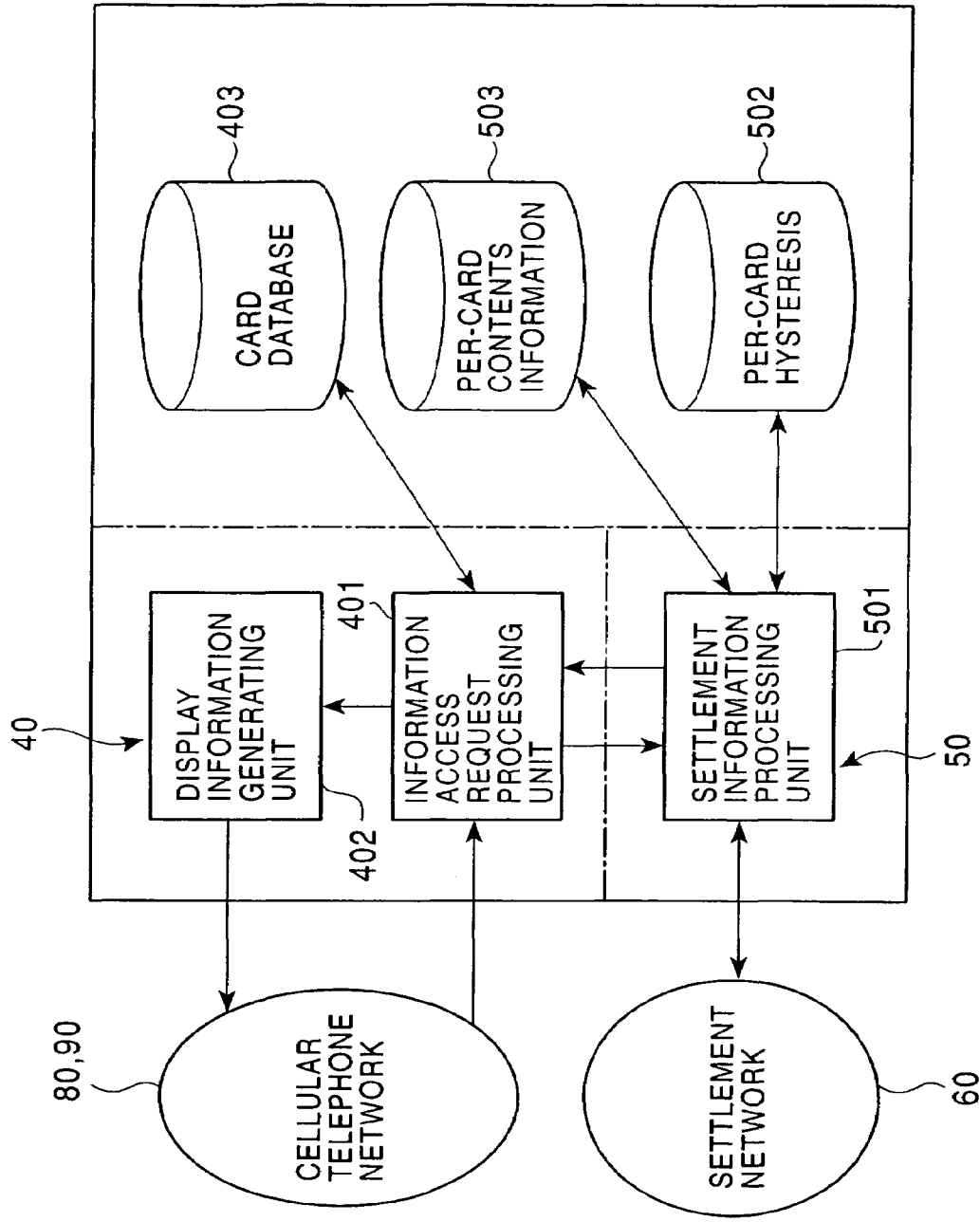
FIG. 5 is a block diagram illustrating the principal components of an information center and settlement center according to the present invention.

As shown in FIG. 5 for example, the information center 40 contains an information access request processing unit 401 and display information generating unit 402, and further a card database 403 provided either internally or externally is connected to the information access request processing unit 401.

Upon receiving an IC card contents information request signal and terminal ID from the portable communication terminal 20 or personal computer communication terminal 30, the information access request processing unit 401 deciphers this and accesses the card database 403 to perform collation of the terminal ID, and in the event that positive collation results are obtained obtains the IC card ID which is registered beforehand corresponding to the terminal ID, requests IC card contents information corresponding to this ID to the settlement center 50, and upon obtaining the contents information from the settlement center 50, supplies this information to the display information generating unit 402.

The display information generating unit 402 enciphers the IC card contents information obtained by the information access request processing unit 401 as display information, and transmits this to the portable communication terminal 20 or personal computer communication terminal 30 making the request via the cellular telephone network 80 or the Internet 90.

Figure 6:
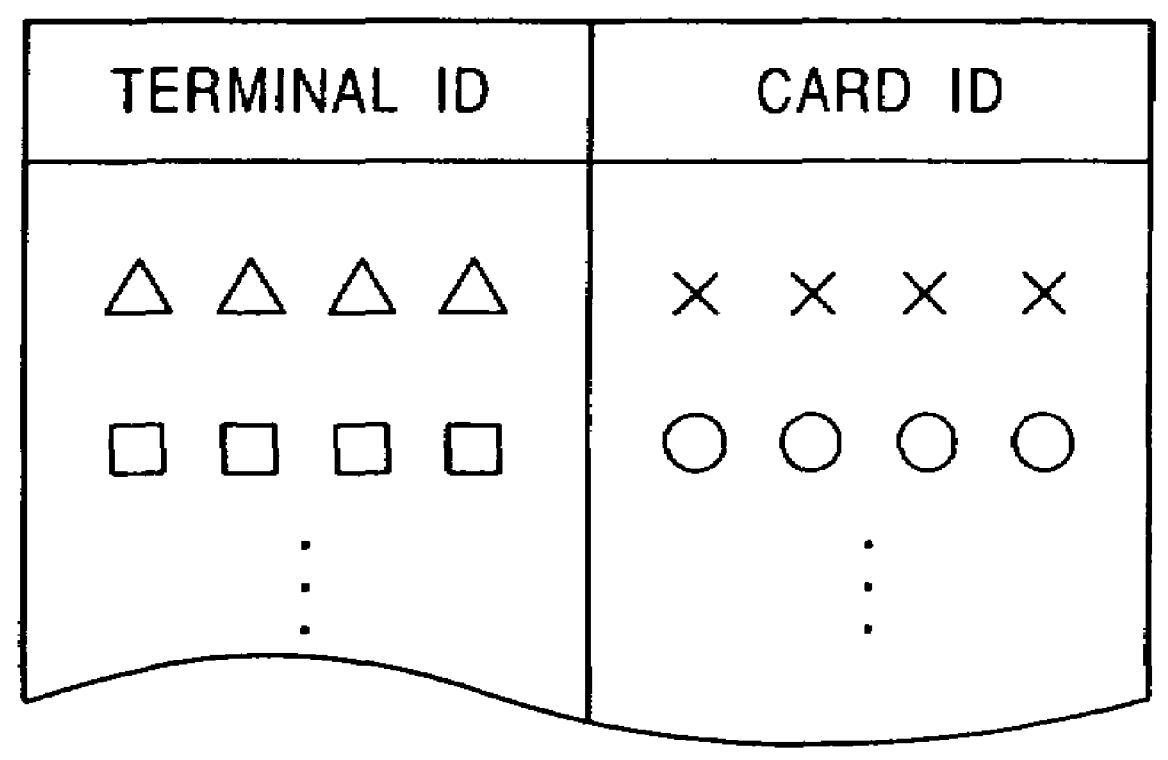

The card database 403 has registered therein card IDs corresponding to terminal IDs, as shown in FIG. 6, for example.

The settlement center 50 is connected to the settlement network 60 and the information center 40, performs predetermined settlement processing by receiving settlement data of the IC card 11 transmitted via the dedicated terminal 12 and settlement network 60, updates the hysteresis of the IC card 11 and the remaining funds information and the like thereof generated by the transaction, and transmits the updated information and the like to the dedicated terminal 12 via the settlement network 60.

Also, upon receiving a contents information access request made up of the IC card hysteresis and remaining funds information and the like, specified at the information center 40 by ID, the settlement center 50 obtains the contents information of this IC card and supplies the information to the information center 40.

As shown in FIG. 5, the settlement center 50 includes a settlement information processing unit 501 which performs predetermined settlement processing on the settlement data of the IC card 11 from the settlement network 60, updates the hysteresis of the IC card 11 and the remaining funds information and the like thereof generated by the transaction, transmits the updated information and the like to the dedicated terminal 12 via the settlement network 60, and upon receiving a contents information access request from the information access request processing unit 401 of the information center 40, obtains the contents information of this IC card and supplies this information to the information center 40.

Also, the settlement information processing unit 501 is connected to an internally or externally provided per-card hysteresis database 502 and per-card remaining funds information (contents information) database 502, and updates the contents of the databases 502 and 503.

Figure 7:
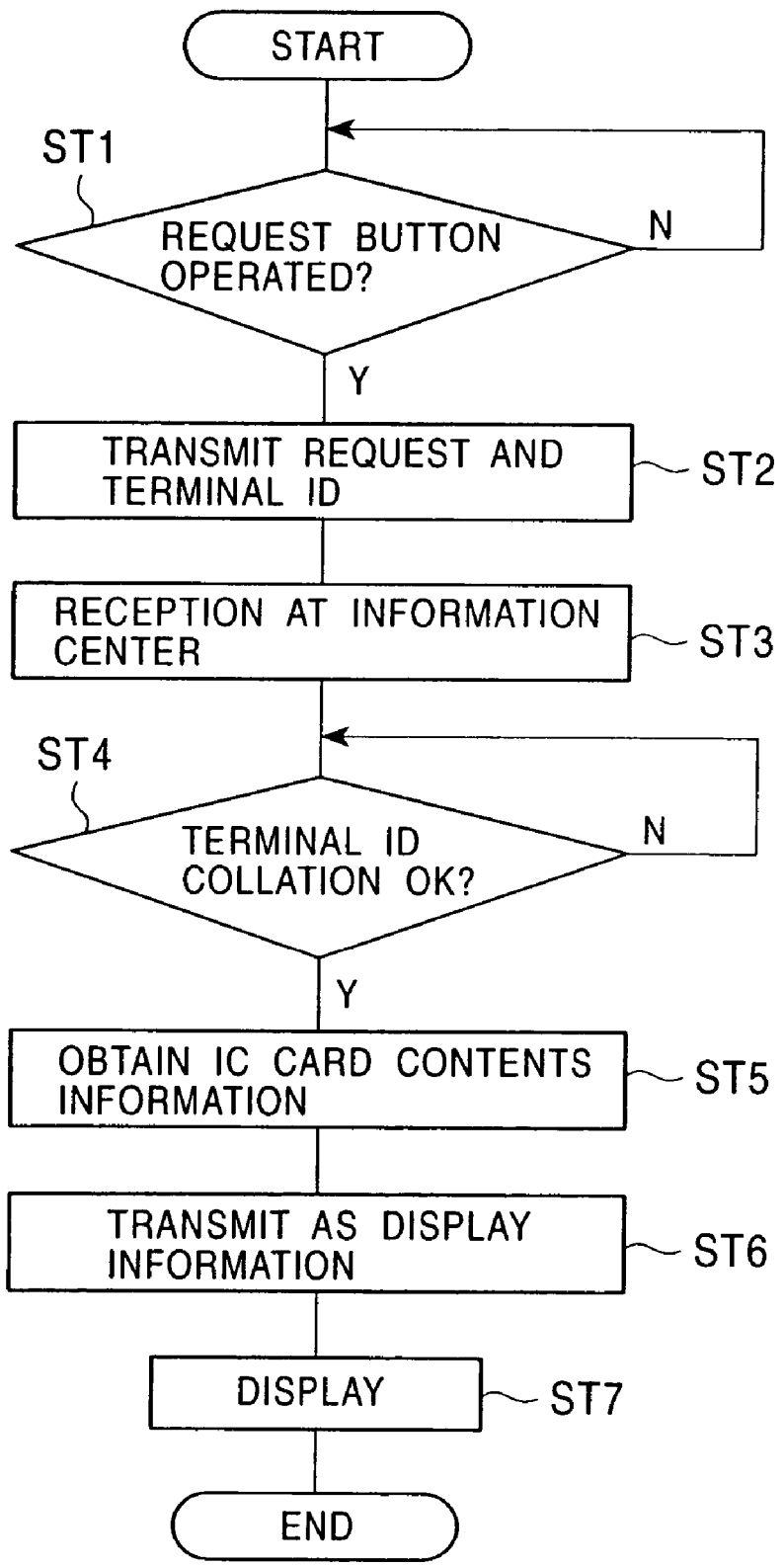
FIG. 7 is a flowchart for describing the operation of the first embodiment.

Next, the display operations of the IC card contents information with the above configuration will be described with relation to the flowchart shown in FIG. 7.

Here, description will be made with regard to an example wherein contents information is displayed on a portable communication terminal (cellular telephone).

First, in the event that the user using the portable communication terminal 20 desires to confirm the contents information of the IC card 11 which he or she caries and uses at shops, the user operates the request button 206 provided on the portable communication terminal 20 (ST1).

Thus, a terminal ID of the portable device is generated along with the contents information request signal as transmission information by the control circuit 207 of the portable communication terminal 20, the generated information is enciphered, and supplied to the reception/transmission circuit 2022.

Then, information containing the contents information request signal and the terminal ID of the portable device are transmitted from the reception/transmission circuit 2022 via the antenna 2021 to the base station 70, wirelessly (ST2).

This transmission information is received by the information access request processing unit 401 of the information center 40 via the cellular telephone network 80 (ST3).

Upon receiving the contents information request signal and the terminal ID from the portable communication terminal 20, the information access request processing unit 401 performs deciphering processing, and then the card database 403 is accessed and terminal ID collation is performed (ST4).

Then, in the event that positive collation results are obtained in step S4, the IC card registered corresponding to the terminal ID beforehand is obtained, and the request for the contents information of the IC card corresponding to this ID is output to the settlement center 50.

At the settlement center 50, upon receiving the contents information access request from the information access request processing unit 401 of the information center 40, the settlement information processing unit 501, the databases 502 and 503 are accessed, contents information of the corresponding IC card are obtained, and supplied to the information center 40.

At the information center 40, upon the contents information being obtained from the settlement center 50, these are supplied to the display information generating unit 402 via the information access request processing unit 401.

At the display information generating unit 402, the contents information of the IC card obtained from the information access request processing unit 401 are enciphered as display information, and transmitted to the requesting portable communication terminal 20 via the cellular telephone network 80 (ST6).

At the portable communication terminal 20, the display information is received via the antenna 2021, demodulation processing is performed at the reception/transmission circuit 2022, and the information is supplied to the control circuit 207.

At the control circuit 207, the demodulated display information is deciphered, and displayed on the display unit 204 (ST7).

The user confirms the remaining funds, hysteresis, etc., of the IC card 11, from the information displayed on the display unit 204 of the portable communication terminal 20.

As described above, according to the first embodiment of the present invention, provided are: communication terminals 20 and 30 wherein in the event that the request button 206 is operated, the identification information of the cellular telephone (terminal ID) is enciphered and transmitted along with the contents information request signal as transmission information, and the received display information is displayed on the display units thereof; an information center 40 which, in the event of receiving an IC card contents information request signal and terminal ID from the communication terminal 20 via the cellular telephone network 80 or receiving an IC card contents information request signal and terminal ID from the personal computer communication terminal 30 via the Internet, performs collation of the terminal ID, and in the event that positive results are obtained for the collation, obtains the ID of the IC card registered beforehand corresponding to the terminal ID, requests contents information of the IC card corresponding to this ID from the settlement center 50, enciphers contents information obtained from the settlement center 50 as display information, and transmits the information to the portable communication terminal 20 or personal computer communication terminal 30 via the cellular telephone network 80 or the Internet 90; and a settlement center 50 which performs predetermined settlement processing regarding the settlement data of the IC card 11 transmitted from a dedicated terminal 12 via the settlement network 60, updates the hysteresis of the IC card 11 and the remaining funds information and the like thereof generated by the transaction, transmits the updated information and the like to the dedicated terminal 12 via the settlement network 60, and upon receiving a contents information access request from the information access request processing unit 401 of the information center 40, obtains the contents information of this IC card and supplies this information to the information center 40; accordingly, the user can readily confirm the contents of the data in the data holding member such as the IC card without necessitating a dedicated device such as a special viewer and without having to carry a dedicated device which is only occasionally used.

Second Embodiment

Figure 8:
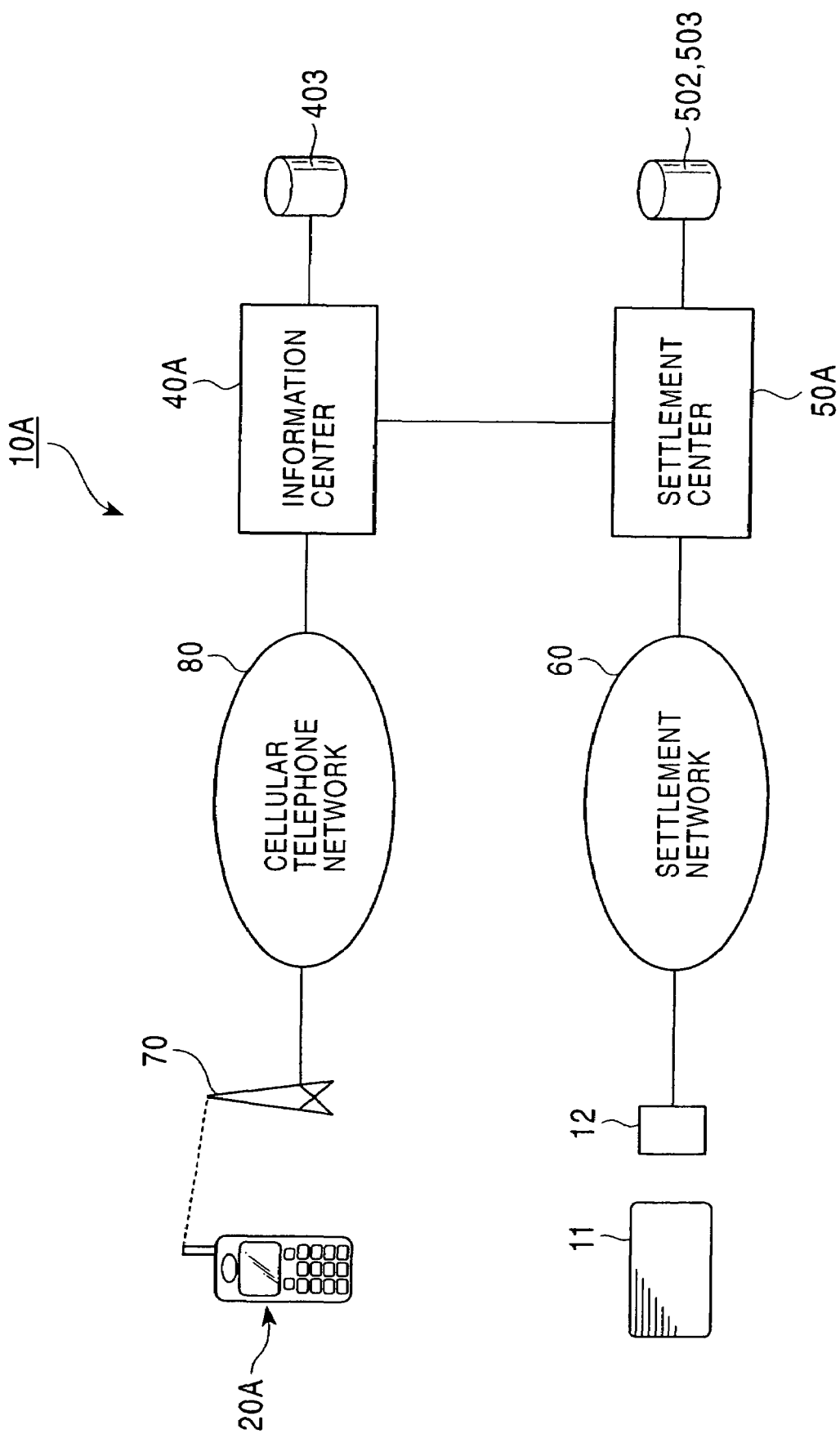
FIG. 8 is a system configuration diagram illustrating a second embodiment of the information providing system according to the present invention.

FIG. 8 is a system configuration diagram illustrating a second embodiment of the information providing system according to the present invention.

This second embodiment differs from the above first embodiment in that, in the event of performing user verification for using the IC card 11 for settlement at a shop, instead of using a numeric keypad on the counter of the shop or the like, the user himself or herself calls the portable communication terminal 20A he or she is carrying, whereby verification is performed at the settlement center 50A according to the confirmation response, and settlement processing is performed in the event that positive results are obtained.

The following is a description of the function components differing from the first embodiment.

Figure 9:
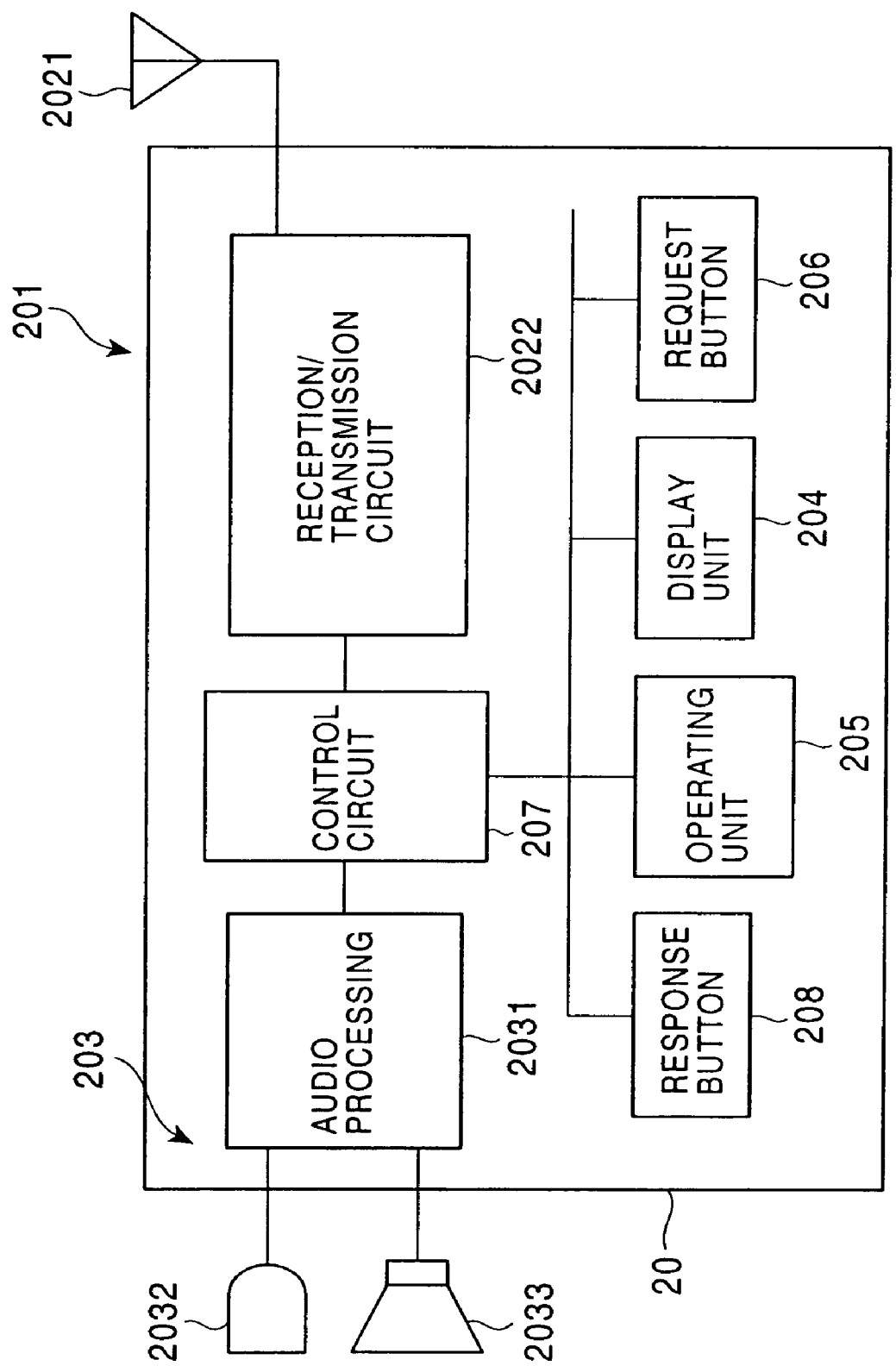
FIG. 9 is a diagram illustrating function blocks of the portable communication terminal (cellular telephone) relating to the second embodiment.

As shown in FIG. 9, according to the second embodiment, a response button 208 is provided to the portable communication terminal 20A in addition to the configuration shown in FIG. 4.

With the portable communication terminal 20A, in the event that the user operates the response button 208 in response to calling for verification, the control circuit 207A enciphers the response signal and terminal ID, and sends this to the reception/transmission circuit 2022.

Also, upon receiving a verification response confirmation request along with the ID of the IC card used from the settlement center 50, the information center 40A confirms the terminal ID corresponding to the card ID registered in the database 503, automatically dials this terminal, and upon receiving the response signal and terminal ID from the portable communication terminal 20A, deciphers and performs terminal ID collation, and in the event that positive collation results are obtained, supplies the response signal to the settlement center 50A.

Upon receiving transaction start information such as card IC, sales data, etc., from the shop via the dedicated terminal 12 and settlement network 60, the settlement center 50A performs collation of the card ID, and in the event that positive collation results are obtained, gives a verification response confirmation request along with the ID of the card 11 to the information center 40A, and upon receiving a response signal from the information center 40A performs predetermined settlement processing and updating processing of the database, and also enciphers the information following the processing and sends this to the dedicated terminal 12 and further to the IC card, via the settlement network.

Figure 10:
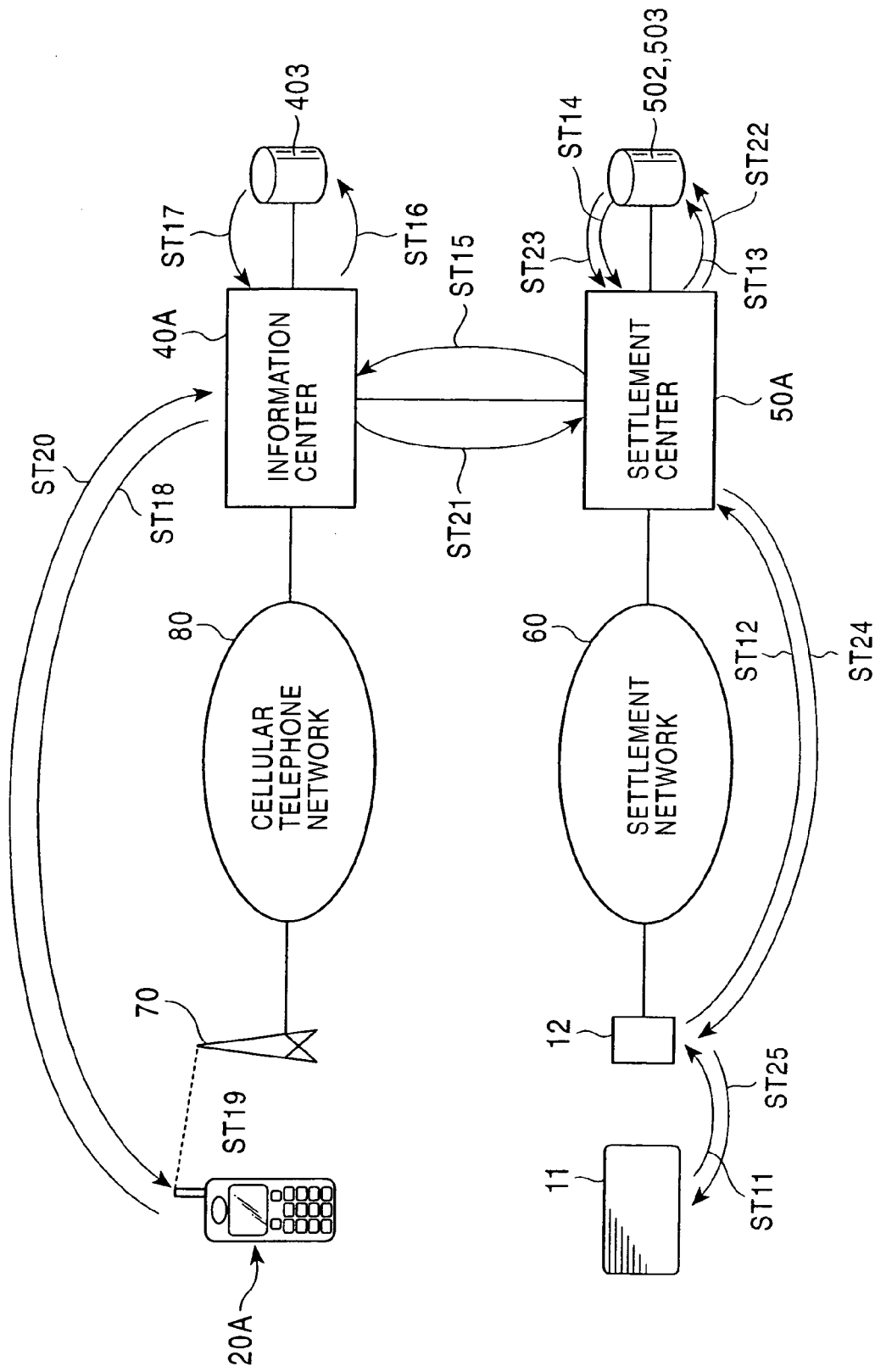
FIG. 10 is a diagram illustrating the operation of the second embodiment.

Next, the operation in a case wherein settlement is performed at a shop using the IC card 11 with the above configuration will be described with reference to FIG. 10.

First, the user of the IC card 11 who desires to purchase merchandise displays the IC card 11 at the shop (ST11).

Upon receiving the display of the IC card 11, the cashier or the like of the shop accesses the dedicated terminal 12 with the IC card 11 either with or without contact, so that information such as sales data, card ID, etc., is transmitted to the settlement center 50A via the settlement network (ST12).

At the settlement center 50A, upon receiving the transaction start information such as sales data, card ID, etc., from the shop, via the dedicated terminal 12 and settlement network 60, collation of the card ID is performed (ST13, ST14)

In the event that positive collation results are obtained, a verification response confirmation request is output to the information center 40A along with the ID of the IC card (ST15).

At the information center 40A, upon receiving the verification response confirmation request from the settlement center 50 along with the ID of the IC card 50 used, confirmation is made of the terminal ID corresponding to the card ID registered in the database 503, the number of the portable communication terminal 20A is obtained (ST16, ST17), and a response request is performed to this terminal by automatic dialing (ST18).

At the portable communication terminal 20A, upon reception of the call for verification, the user operates the response button 208 in response to the ring (ST19).

Thus, the response signal and the terminal ID are enciphered by the control circuit 207A, and transmitted to the base station 70 via the reception/transmission circuit 2022 and antenna 2021.

The response signal and the terminal ID, upon reaching the base station 70, are received by the information center 40A via the network 80.

At the information center 40A which has received the response signal and the terminal ID, the response signal and the terminal ID, and deciphered and collation of the terminal ID is performed. In the event that positive collation results are obtained, the response signal is supplied to the settlement center 50A (ST21).

At the settlement center 50A which has received the response signal, predetermined settlement processing and database updating processing is performed (ST22), and at the point that the processing thereof is completed (ST23), processing signal information is transmitted to the dedicated terminal 12 via the settlement network 60 as a completion signal (ST24).

The completion signal received at the dedicated terminal 12 is demodulated, and supplied to the IC card 11.

Then, at the IC card 11, card data updating processing in the memory unit is performed under control of the control unit (ST25).

According to the second embodiment of the present invention, provided are: a portable communication terminal wherein, in the event that the user operates the response button 208 in response to calling for verification, the control circuit 207A enciphers the response signal and terminal ID, and sends this to the reception/transmission circuit 2022; an information center 40A which, upon receiving a verification response confirmation request along with the ID of the IC card used from the settlement center 50, confirms the terminal ID corresponding to the card ID registered in the database 503, automatically dials this terminal, and upon receiving the response signal and terminal ID from the portable communication terminal 20A, deciphers and performs terminal ID collation, and in the event that positive collation results are obtained, supplies the response signal to the settlement center 50A; and a settlement center 50A which, upon receiving transaction start information such as card IC, sales data, etc., from the shop via the dedicated terminal 12 and settlement network 60, the settlement center 50A performs collation of the card ID, and in the event that positive collation results are obtained, gives a verification response confirmation request along with the ID of the card 11 to the information center 40A, and upon receiving a response signal from the information center 40A performs predetermined settlement processing and updating processing of the database, and also enciphers the information following the processing and sends this to the dedicated terminal 12 and further to the IC card, via the settlement network; accordingly, verification information or the like being observed or stolen at predetermined settlement locations can be prevented, unauthorized use can be prevented, and settlement can be performed with a high degree of safety.

Also, with the second embodiment, the portable communication terminal 20A includes the contents information confirming functions of the first embodiment, and, accordingly, the advantages of the above first embodiment can be obtained as well.

Of course, a portable communication terminal 20A can be configured not having the contents information confirming functions of the first embodiment.

Now, the second embodiment has been described with reference to an arrangement wherein verification confirmation is made based on a response signal from the portable communication terminal and terminal ID, but the present invention is by no means restricted to this arrangement; for example, arrangements may be made wherein location information regarding a cellular telephone is used as confirmation information, for example.

In this case, the usable area of the portable communication terminal as a verification confirming terminal can be specified and registered beforehand, so that verification confirming is performed only in the event that position information obtained by the call (response) indicates that the portable communication terminal exists in the specified area, or various other arrangements may be made.

Third Embodiment

Figure 11:
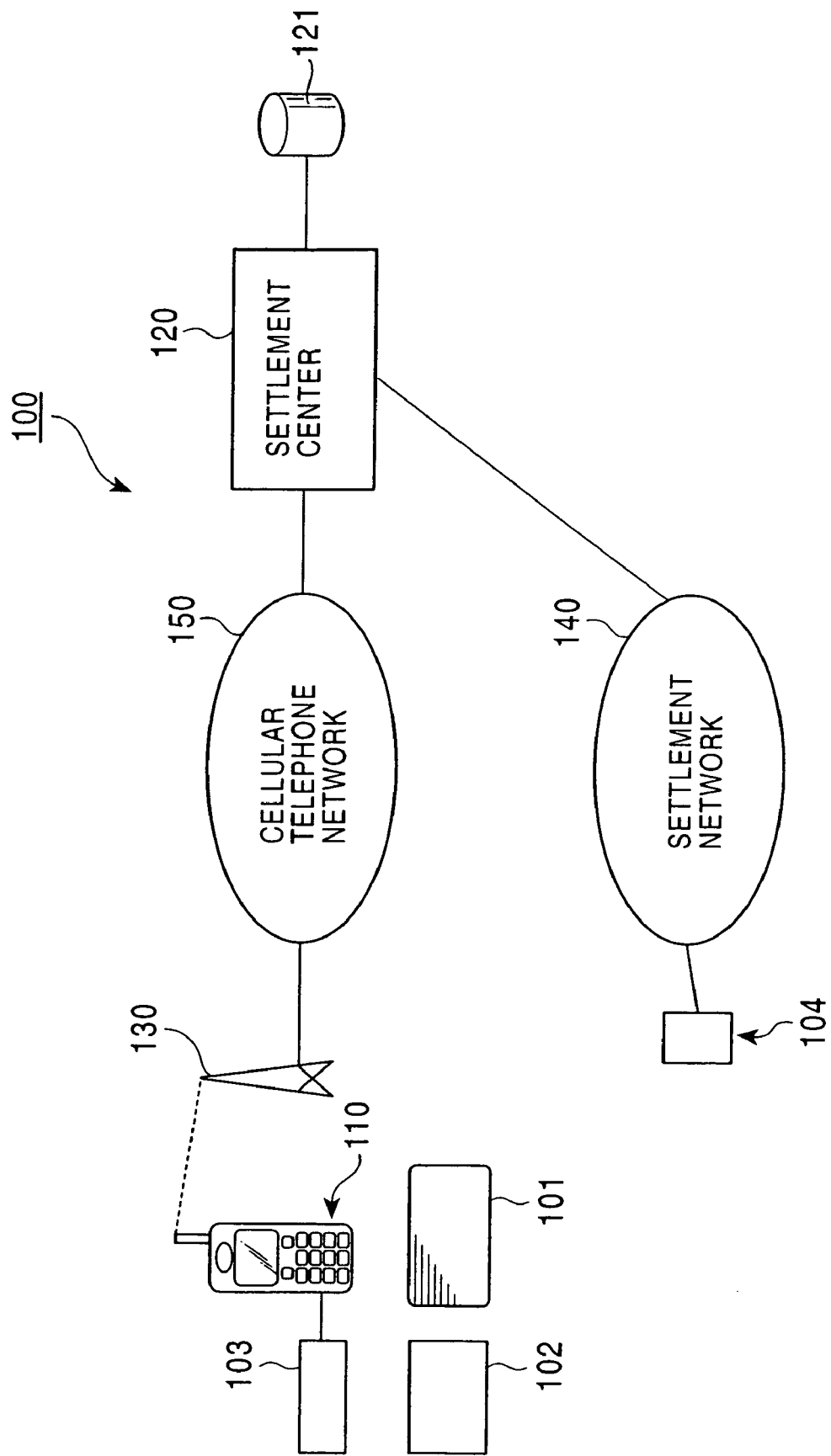
FIG. 11 is a system configuration diagram illustrating a third embodiment of the information providing system according to the present invention.

FIG. 11 is a system configuration diagram illustrating a third embodiment of the information providing system according to the present invention.

With the third embodiment, the arrangement is such that the IC card itself is not used for transactions with a dedicated terminal installed at a shop or the like, but rather settlement can be performed on the side of the user (the cardholder of the IC card), at home for example.

Accordingly, with the third embodiment, not only does the user have an IC card, but the vendor (shop) side also has an IC card (hereafter referred to as "shop-side IC card"), and the arrangement is such that the vendor takes the shop-side IC card to the home or the like of the user and performs shop verification using a portable reader/writer, for example, which is a dedicate terminal owned by the user, and also performs normal translations using a normal user IC card.

The present information providing system 100 is made up of a user IC card 101, a shop-side IC card 102, a portable dedicated terminal 103, a dedicated terminal 104 such as a POS terminal or reader/writer, or vending machine or the like, a portable communication terminal 110, a settlement center 120, a settlement network 130, a base station 140, and a cellular telephone network 150.

Figure 12:
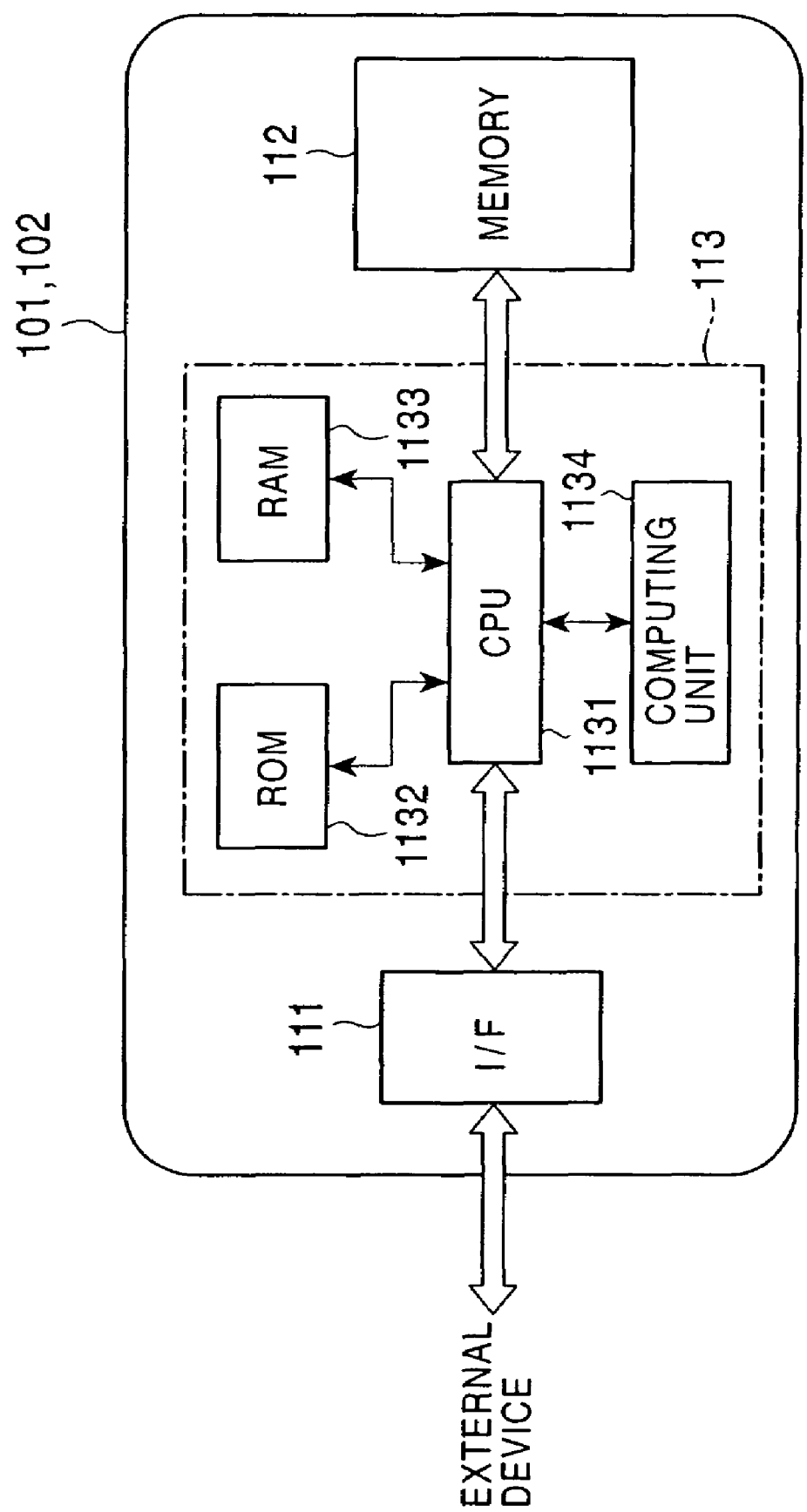
FIG. 12 is a diagram illustrating function blocks of an IC card according to the third embodiment.

The user IC card 101 and shop-side IC card 102 basically have the same configuration, and as shown in FIG. 12, for example, each is primarily made up of an interface unit 111, a memory unit 112, and a control unit 113.

The interface unit 111 is for exchanging data between the control unit 113 and a dedicated terminal 103 which is an external device, i.e., for performing communication processing, either through contact or without contact.

The memory unit 112 is made up of non-volatile memory, for example, and in the case of the user IC card 101, stores, under control of the control unit 113, the verification number of the cardholder of the IC card 101, information relating to the account of the user and relating to the bank where the account is situated, and further, unsettled information and transaction completion information containing information relating to the bank account number of the vendor of goods or services, items purchased, the price of the items purchased, date and time of purchase, etc., each time goods or services are purchased using a portable dedicated terminal 103 or a dedicated terminal installed in a shop such as a POS terminal, reader/writer, vending machine, etc.

In the same way, the memory unit 112 in the case of the shop-side IC card 102 stores the verification number of the cardholder of the IC card 102, the shop number, information relating to the account of the cardholder and relating to the bank where the account is situated, and further, unsettled information and transaction completion information containing information relating to the bank account number of the vendor of goods or services, items purchased, the price of the items purchased, date and time of purchase, etc., each time goods or services are purchased using a portable dedicated terminal 103 or a dedicated terminal installed in a shop such as a POS terminal, reader/writer, vending machine, etc.

The control unit 113 contains, for example, a CPU 1131, ROM 1132, RAM 1133, and a computing unit 1134, so as to read out application programs stored in the ROM 1132 or data stored in the memory unit 112 and RAM 1133, thereby performing verification processing, settlement processing, or enciphering/deciphering processing.

The portable dedicated terminal 103 performs communication processing with the IC cards 100 and 102, either through contact or without contact, and also performs communication processing with the portable communication terminal 110, either through contact or without contact.

Now, the third embodiment illustrates an example wherein the portable dedicated terminal 103 is externally mounted to the portable communication terminal 110, but an arrangement may be made wherein the portable dedicated terminal 103 is built into the portable communication terminal 110.

Figure 13:
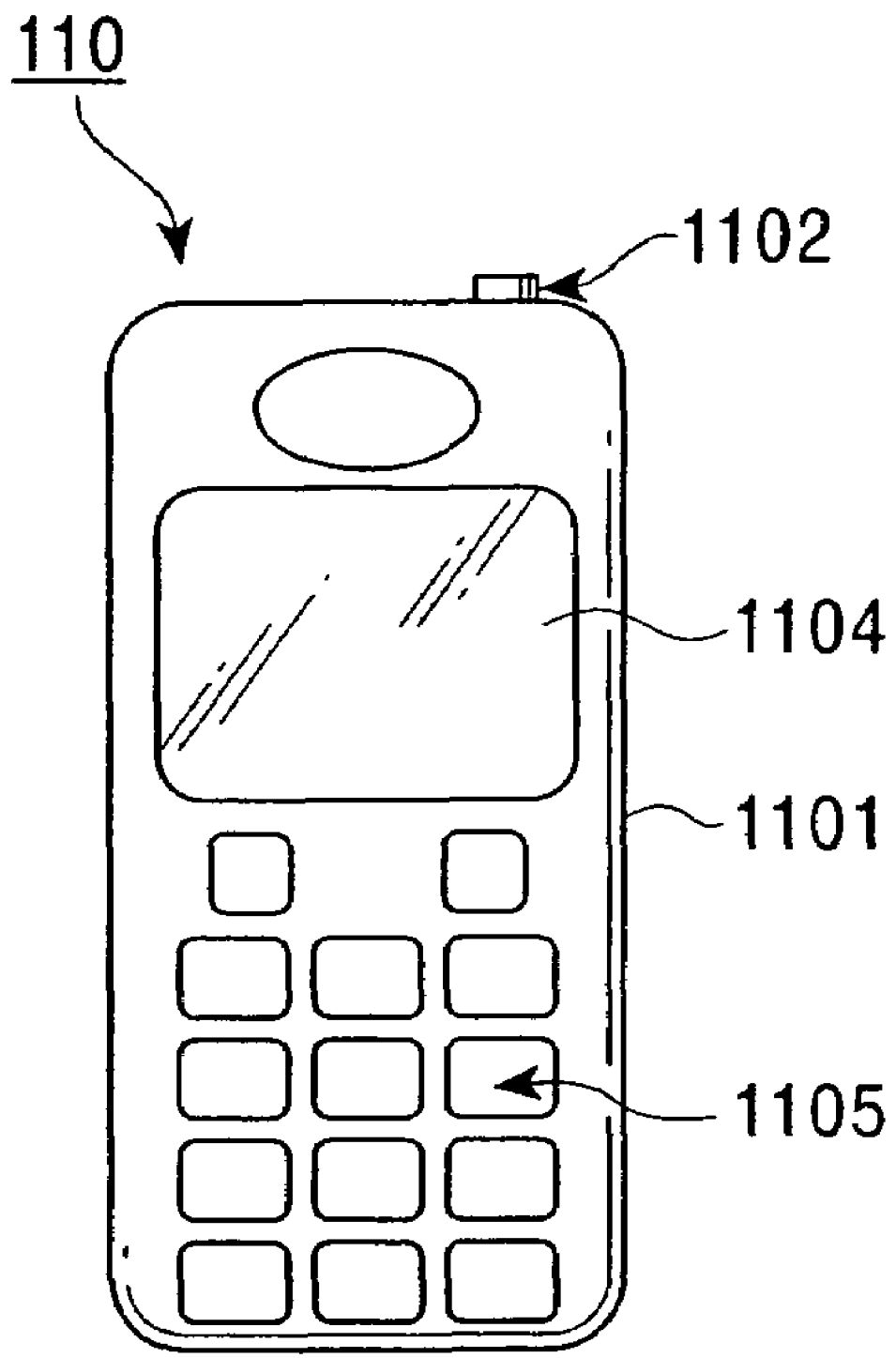
FIG. 13 is an external view of a portable communication terminal (cellular telephone) relating to the third embodiment.
Figure 14:
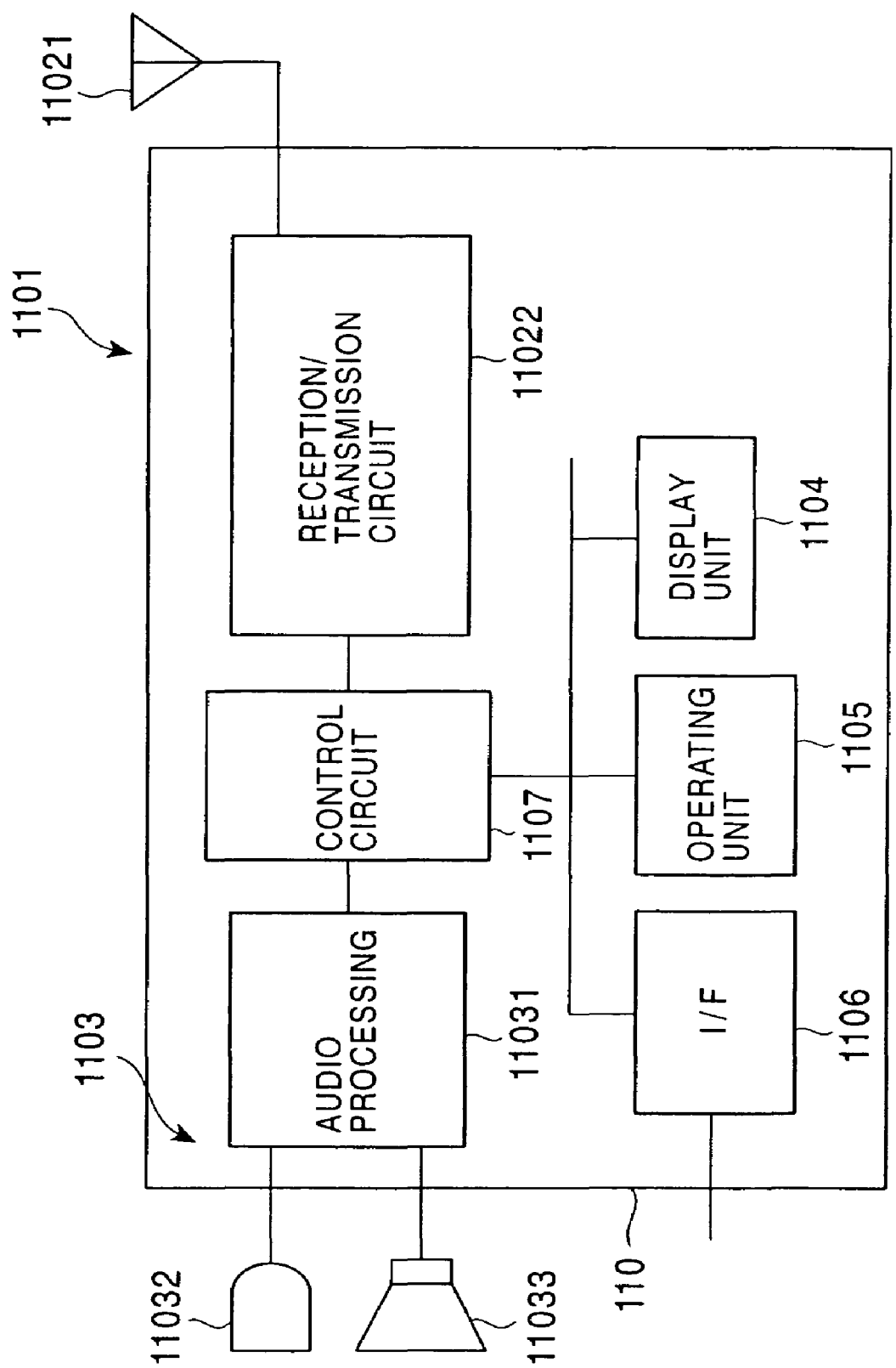
FIG. 14 is a diagram illustrating function blocks of the portable communication terminal (cellular telephone) relating to the third embodiment.

The portable communication terminal 110 is made up of a cellular telephone for example, and as shown in FIGS. 13 and 14, includes a main unit case 1101, a communication unit 1102, an audio unit 1103, a display unit 1104, an operating unit 1105, an interface unit 1106 for interfacing with the portable dedicated terminal 103, and a control circuit 1107.

The communication unit 1102 includes an antenna 11021 and a reception/transmission circuit 11022.

The reception/transmission circuit 11022 performs modulation of various types of information such as audio information or terminal ID or the ID of the user IC card 101 or shop-side IC card 102 from the portable dedicated terminal 103 or the like enciphered at the control circuit 1107 and transmits this to the base station 130, and demodulates the various types of information such as information of the contents of the user IC card 101 or shop-side IC card 102, audio information, etc., received via the antenna 11021 which is output to the control circuit 1107, thereby performing wireless communication using radio waves.

The audio unit 1103 includes an audio processing circuit 11031, a microphone 11032, and a speaker 11033.

The audio processing circuit 11031 is connected to the microphone 11032 for performing audio input for communication functions, and the speaker 11033 for performing audio output, wherein voice and like audio input from the microphone 11032 is subjected to predetermined processing and is supplied to the control circuit 1107, and audio information supplied from the control circuit 1107 is subjected to predetermined processing and is output from the speaker 11033.

The display unit 1104 is made up of a liquid crystal device or the like, and displays information of the contents of the IC card 11 transmitted from the settlement center 120, telephone numbers input for communication functions, etc.

The operating unit 1105 is configured of a keyboard for inputting telephone numbers for communication functions, and inputting predetermined operation instructions.

The interface unit 1106 is for exchanging data between the control circuit 1107 and the dedicated terminal 103 which is an external device, i.e., communication processing, either through contact or without contact.

The control circuit 1107 performs overall control of the communication terminal 110, so as to, for example, perform deciphering processing of the various types of information demodulated by the reception/transmission circuit 11022, performs enciphering processing for the various types of information transmitted to the information center 40 via the base station 130 and network 150, perform audio processing, display processing, and so forth.

Upon receiving transaction start information such as card ID, transaction start information, sales data, etc., from a portable communication terminal 110 which differs to that at the shop via a portable communication terminal 110, base station 130, and cellular telephone network 150, or from a shop via a dedicated terminal 104 and settlement network 130, the settlement center 120 performs collation of the card ID of the user IC card 101, and in the event that positive results are obtained, performs predetermined settlement processing and updating processing of the database, and also enciphers the information following the processing and sends this to the cellular telephone network 150 or dedicated terminal 104.

Specifically, in the event that settlement is performed at home, first the settlement center 120 performs ID collation of the shop-side IC card 102, and in the event that positive results are obtained, enciphers the information following the processing and sends this to a portable communication terminal 110 which differs to that at the shop, via the cellular telephone network 150.

Then, upon receiving the ID of the user IC card 101, the settlement center 120 performs ID collation thereof, and in the event that positive results are obtained, enciphers the information following the processing and sends this to the cellular telephone network 150.

Figure 15:
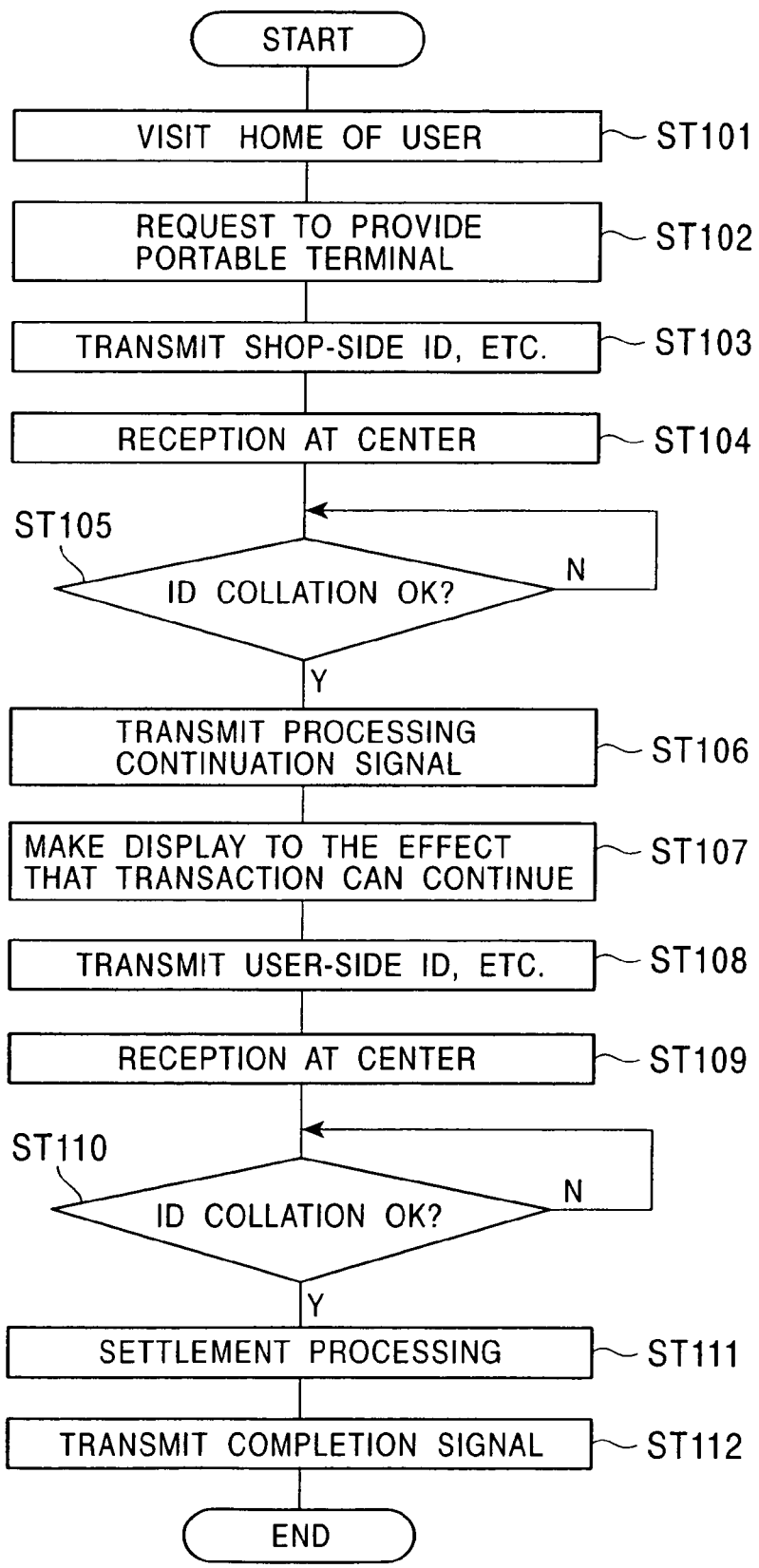
FIG. 15 is a flowchart illustrating the operations of the third embodiment.

Next, the operation of an arrangement wherein settlement is performed at home using the shop-side IC card 102 and the user IC card 101, with reference to the flowchart shown in FIG. 15.

A salesperson of the vendor takes a shop-side IC card 102 and visits the home of the user of the user IC card 101 who desires to purchase merchandise (ST101).

The salesperson requests the user to provide a portable communication terminal 110 and dedicated terminal 103 (ST102).

The salesperson, upon being provided with the portable communication terminal 110 and dedicated terminal 103, first accesses the dedicated terminal 103 with the shop-side IC card 102, either through contact or without contact.

Thus, the various types of information including the card ID of the shop-side IC card 102 is input to the control circuit 1107 via the interface unit 1106 of the portable communication terminal 110. At the control circuit 1107, various information including the card ID of the shop-side IC card 102 is enciphered and supplied to the reception/transmission circuit 11022.

Then, the various information including the card ID is wirelessly transmitted to the base station 130 from the reception/transmission circuit 11022 via the antenna 11021 (ST103).

This transmitted information is received at the settlement center 120 via the cellular telephone network 150 (ST104).

At the settlement center 120, ID collation of the shop-side IC card 102 is performed (ST105), and in the event that positive collation results are obtained, a transaction processing continuation signal is enciphered and transmitted to a portable communication terminal 110 which differs to that at the shop, via the cellular telephone network 150 (ST106).

At the portable communication terminal 110, the transaction processing continuation signal is received via the antenna 11021, demodulating is performed at the reception/transmission circuit 11022, and this is supplied to the control circuit 1107.

At the control circuit 1107, the demodulated information is deciphered, and a message to the effect that the transaction can continue is displayed on the display unit 1104 (ST107).

Also, the transaction processing continuation signal is transmitted to the dedicated terminal 103 via the interface unit 1106.

The completion signal received at the dedicated terminal 103 is demodulated, and supplied to the IC card 102.

Then, at the IC card 102, under control of the control unit, card data updating processing is performed at the memory unit.

The salesperson confirms that the transaction can continue, from the information displayed on the display unit 1104 of the portable communication terminal 110, and next, accesses the dedicated terminal 103 with the user IC card 101, either through contact or without contact.

Thus, various information including the card ID of the user IC card 101 and trading information such as sales data is input to the control circuit 1107 via the interface unit 1106 of the portable communication terminal 110. At the control circuit 1107, the various information including the card ID of the user IC card 101 is enciphered and supplied to the reception/transmission circuit 11022.

Then, the various information including the card ID is wirelessly transmitted to the base station 130 from the reception/transmission circuit 11022 via the antenna 11021 (ST108).

This transmitted information is received at the settlement center 120 via the cellular telephone network 150 (ST109).

At the settlement center 120, ID collation of the shop-side IC card 102 is performed (ST110), and in the event that positive collation results are obtained, predetermined settlement processing and database updating processing is performed (ST111), and at the point that this processing ends, processing information is enciphered as a completion signal and transmitted to a portable communication terminal 110 which differs to that at the shop, via the cellular telephone network 150 (ST112).

At the portable communication terminal 110, the completion signal is received via the antenna 11021, demodulating processing is performed at the reception/transmission circuit 11022, and this is supplied to the control circuit 1107.

At the control circuit 1107, the demodulated information is deciphered, and a message to the effect that the transaction has completed is displayed on the display unit 1104.

Also, the completion signal is transmitted to the dedicated terminal 103 via the interface unit 1106.

The completion signal received at the dedicated terminal 103 is demodulated, and supplied to the IC card 101.

Then, at the IC card 102, under control of the control unit, card data updating processing is performed at the memory unit.

As described above, according to the third embodiment of the present invention, not only does the user have an IC card, the vendor (shop) side also has a shop-side IC card 102, and the arrangement is such that the vendor visit the home or the like of the user with the shop-side IC card 102 and performs shop verification using a portable reader/writer, for example, which is a dedicated terminal owned by the user, and also performs normal transaction using the user IC card 101, so there is no need to install a dedicated terminal at the shop, which reduces costs for the shop and also prevents unauthorized use, and settlement can be performed with a high degree of safety.

Now, the third embodiment has been described with reference to an arrangement wherein verification confirmation is made based on the ID from the portable communication terminal, but the present invention is by no means restricted to this arrangement; for example, arrangements may be made wherein location information regarding a cellular telephone is used as confirmation information, for example.

In this case, the usable area of the portable communication terminal as a verification confirming terminal can be specified and registered beforehand, so that verification confirming is performed only in the event that position information obtained by the call (response) indicates that the portable communication terminal exists in the specified area, or various other arrangements may be made.

Programs and the like for executing the steps carried out at the information center and settlement center in the first through third embodiments are stored in computer-readable recording media such as hard disks, optical disks, semiconductor storing devices, etc., and are read out and executed by computers installed at the centers.

As described above, the present invention is advantageous in that users can readily confirm the contents of the data in a data holding member such as an IC card without necessitating installment of a special viewer and without necessitating the user to carry a device which is only occasionally used.

Also, the present invention is advantageous in that verification information or the like can be prevented from being observed or stolen at predetermined settlement locations, unauthorized use can be prevented, and settlement can be performed with a high degree of safety.

Note that the series of processing carried out by the information providing method according to the present invention can be executed by hardware or by software. In the event that the series of processing is to be executed by software, a computer with built-in dedicated hardware containing the program having the software may be used, or a computer capable of executing various functions by installing various types of programs, such as a general-purpose personal computer, for example, with the program having the software being installed from a recording medium or downloaded via network, may be used.

Although the present invention has been described with reference to specific embodiments, those of skill in the art will recognize that changes may be made thereto without departing from the spirit and scope of the invention as set forth in the hereafter appended claims.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A transaction verification device comprising:
a portable communication terminal, wherein said portable communication terminal includes a verification input device, a signal transmitter and a signal receiver,
wherein the signal transmitter is configured to transmit a portable communication terminal identifier and a request for contents information of a portable device to an information center having registered therein a plurality of portable communication terminal identifiers and a plurality of portable device identifiers, wherein each of the portable device identifiers corresponds to one of the portable communication terminal identifiers,
wherein the signal receiver is configured to receive a verification request, wherein the verification request is transmitted via a cellular transmission, wherein the verification request is initiated by an information processing unit in response to a transaction attempt between a portable device and a device configured to read data associated with the portable device, and
wherein the signal transmitter is configured to transmit a verification signal if verification is obtained via the verification input device, wherein verification is obtained by manually operating the verification input device.

2. The transaction verification device of claim 1, wherein the portable device is an IC card.

3. The transaction verification device of claim 1, wherein the portable communication terminal is a cellular telephone.

4. The transaction verification device of claim 1, wherein the portable communication terminal includes a display device configured to display at least part of the verification request.

5. The transaction verification device of claim 1, wherein the signal transmitter is further configured to transmit the verification signal via a cellular transmission.

6. The transaction verification device of claim 1, wherein the transaction attempt is an attempted purchase.

7. The transaction verification device of claim 1, wherein the transaction attempt is an attempted transfer.

8. A method of verifying an attempted transaction comprising:
transmitting a portable communication terminal identifier and a request for contents information of a portable device to an information center having registered therein a plurality of portable communication terminal identifiers and a plurality of portable device identifiers, wherein each of the portable device identifiers corresponds to one of the portable communication terminal identifiers,
receiving a verification request at a portable communication terminal, wherein the verification request is transmitted via a cellular transmission, wherein the verification request is initiated by an information processing unit in response to an attempted transaction between a portable device and a device configured to read data associated with the portable device; and
transmitting a verification signal, wherein transmitting is initiated if a verification input device is manually operated.

9. The method of claim 8, wherein the verification signal includes location information associated with a portable communication terminal.

10. The method of claim 8, wherein the portable device is an IC card.

11. The method of claim 8, wherein the portable communication terminal is a cellular telephone.

12. The method of claim 8, further comprising displaying at least a portion of the verification request on a display device of the portable communication terminal.

13. The method of claim 8, wherein transmitting the verification signal includes transmitting the verification signal via a cellular transmission.

14. The method of claim 8, wherein the attempted transaction is an attempted purchase.

15. The method of claim 8, wherein the attempted transaction is an attempted transfer.

16. The transaction verification device of claim 1, wherein the information processing unit is selected from the group consisting of: a settlement center, an information providing center, a financial institution, and a bank.

17. The method of claim 8, wherein the information processing unit is selected from the group consisting of: a settlement center, an information providing center, a financial institution, and a bank.

18. A method of enabling processing of a transaction, said method comprising:
  (a) receiving a signal at an information center, the signal corresponding to a request to process a transaction associated with a portable device, the signal including a portable communication terminal identifier and a request for contents information of a portable device, wherein the information center has registered therein a plurality of portable communication terminal identifiers and a plurality of portable device identifiers, wherein each of the portable device identifiers corresponds to one of the portable communication terminal identifiers;
  (b) transmitting a verification request signal to a portable communication terminal via a cellular transmission, wherein the portable communication terminal transmits a verification signal if a verification input device is manually operated;
  (c) receiving the verification signal from the portable communication device; and
  (d) transmitting a transaction processing continuation signal, wherein the transaction processing continuation signal enables the transaction to be processed.

19. The method of claim 18, wherein transmitting a transaction processing continuation signal is initiated if a verification input device is manually operated.

20. The method of claim 18, wherein the verification signal includes location information associated with the portable communication terminal.

21. The method of claim 18, wherein the portable device is an IC card.

22. The method of claim 18, wherein the portable communication terminal is a cellular telephone.

23. The method of claim 18, further comprising displaying at least a portion of the verification request on a display device of the portable communication terminal.

24. The method of claim 18, wherein receiving the verification signal includes receiving the verification signal via a cellular transmission.

25. The method of claim 18, wherein the transaction is a purchase.

26. The method of claim 18, wherein the transaction is a transfer.

27. The transaction verification device of claim 1, wherein the information center collates the portable communication terminal identifier transmitted by the signal transmitter and the portable communication terminal identifiers registered in the information center.

28. The transaction verification device of claim 27, wherein if positive collation results are obtained, the information center transmits the portable device identifier registered therein to a settlement center.

29. The method of claim 8, wherein the information center collates the portable communication terminal identifier transmitted by the signal transmitter and the portable communication terminal identifiers registered in the information center.

30. The method of claim 29, wherein if positive collation results are obtained, the information center transmits the portable device identifier registered therein to a settlement center.

31. The method of claim 1, wherein the information center collates the portable communication terminal identifier transmitted by the signal transmitter and the portable communication terminal identifiers registered in the information center.

32. The method of claim 31, wherein if positive collation results are obtained, the information center transmits the portable device identifier registered therein to a settlement center.

* * * * *